United States Patent
Dyer

[11] 3,786,327
[45] Jan. 15, 1974

[54] A.C. INDUCTION MOTOR SPEED CONTROL SYSTEMS

[76] Inventor: Douglas M. Dyer, 308 S. Nineth, Noblesville, Ind. 46060

[22] Filed: Oct. 7, 1971

[21] Appl. No.: 187,281

[52] U.S. Cl............... 318/211, 318/225, 318/227, 318/230
[51] Int. Cl. .................................................. H02p 3/20
[58] Field of Search................. 318/211, 212, 225, 318/227, 230

[56] References Cited
UNITED STATES PATENTS
2,448,256  8/1948  Elliot ............................... 318/211
3,349,307  10/1967  Licata et al. ..................... 318/227 X
3,504,255  3/1970  L'Esperance .................... 318/212 X
3,514,682  5/1970  Corey ............................. 318/212

Primary Examiner—Gene Z. Rubinson
Attorney—John Cameron McNett et al.

[57] ABSTRACT

Circuits for the control of the speed of an A.C. induction motor are disclosed. These circuits use SCR's to introduce a D.C. component into the windings of an A.C. motor to cause a controlled amount of dynamic braking to counteract a portion of the torque produced by the A.C. voltage to the motor. This results in a very inexpensive method of controlling the speed of an A.C. induction motor while maintaining excellent inherent speed regulation.

18 Claims, 8 Drawing Figures

INVENTOR
DOUGLAS M. DYER

INVENTOR
Douglas M. Dyer
BY
Woodard Weikart Emhardt & Naughton
ATTORNEYS

A.C. INDUCTION MOTOR SPEED CONTROL SYSTEMS

BACKGROUND OF THE INVENTION

This invention relates to variable speed control circuits for use with alternating current induction type motors.

Heretofore, one method of varying the speed of alternating current induction type motors was accomplished by varying the frequency of the source of power for the motor or by changing the number of motor poles. With the introduction of power semiconductor devices, it was found that the speed of motors of this type could be varied simply and economically by controlling the magnitude of the potential applied to the motor. This method of controlling speed, however, resulted in a low starting torque and in relatively poor regulation of the speed of the motor under varying conditions.

To better control the speed, acceleration and deceleration of alternating current induction motors, Corey in his U.S. Pat. No. 3,514,682 disclosed a circuit in which a variable D.C. component is introduced into one of the windings of a three phase induction motor by using a complex circuit having well over 150 components. While this may have improved the quality of the speed control, it is expensive to build and, due to the number of parts which can fail, is expensive to maintain.

L'Esperance, in his U.S. Pat. No. 3,504,255 disclosed a rather simple circuit for use with induction motors and which has a diode in series with one of the motor windings. A second diode and a resistor were used to produce a flyback current which exerted a braking action on the motor. One of the problems with this circuit is that it is very inefficient in controlling large motors due to the resistances through which large currents must flow.

Other U.S. patents which relate to speed control systems for A.C. motors are Nos.: 3,341,758 to Plumpe; 3,349,307 to Licata et al, 3,353,077 to Egglestone et al, 3,387,196 to Graham et al, 3,389,315 to Andreas et al, 3,421,063 to Reinke, 3,461,370 to Canter, 3,541,411 to Sharp.

SUMMARY OF THE INVENTION

The invention relates to circuits which use controlled rectifiers to cause dynamic braking which is used to control the speed of an A.C induction motor. These rectifiers are either placed in series or in shunt with one of the windings of the motor.

These circuits offer a very inexpensive and simple means for controlling the speed of an induction motor.

DETAILED DESCRIPTION OF THE PREFERRED EMBODIMENT

Figure 1:
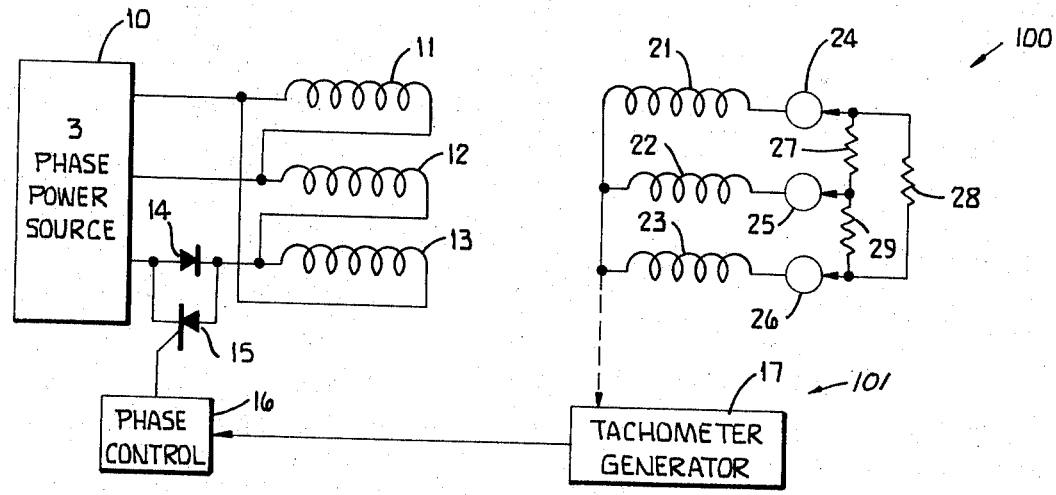
FIG. 1 illustrates one embodiment of the invention in which a wound rotor motor has a speed control derived from a tachometer generator.

In FIG. 1 there is illustrated a three phase power source 10 to which a motor 100 and control circuit 101 are connected. The motor includes stator windings 11, 12 and 13 and rotor windings 21, 22 and 23. The motor is a wound rotor A.C. induction motor having slip rings 24, 25 and 26 connecting the windings to external resistances 27, 28 and 29, which are relatively high in value, to assure optimum operation of the speed control circuit.

The control of the speed of this motor is derived from a tachometer generator 17 which produces a voltage proportional to the speed of rotation of the rotor. This voltage then controls a phase control 16 which controls the gate of SCR 15. Both the tachometer generator and the phase control circuit are of types well known in the art, thus they need no further description.

When the SCR 15 is gated on, the stator windings all receive a full A.C. voltage from the three phase power source because diode 14 is in parallel with SCR 15. As the speed of the rotor increases the output of the tachometer generator increases and the phase control 16 ccauses SCR 15 to be conductive during a smaller portion of each cycle.

When the SCR is gated off during a portion of the time that it could be forwardly conducting a net D.C. current will be produced and caused to flow through at least one of the stator windings thereby producing a braking action which is generally known as "dynamic braking." The amount of dynamic braking produced will be dependent upon the amount of D.C. current passing through the stator windings and the speed of the rotor. When SCR 15 is gated off all of the time, a maximum amount of D.C. current will be produced in the stator windings and the maximum braking action will be achieved. It may be noted that there is an inherent stability in this method for maintaining speed due to the fact that an increase in speed will cause an increase in the dynamic braking thereby tending to decrease the speed and a decrease in speed will cause a decrease in dynamic braking thereby tending to lessen the amount of the speed decrease.

It may be noted that the circuit of FIG. 1 during the time when dynamic braking is occuring introduces a D.C. component into the power lines as well as into the motor. This is of little concern where the motor draws but a small fraction of the power supplied from the power source. However, if a large number of these motors were connected to a power source there is the possibility of saturation of a transformer in the power source if the polarity of the D.C. currents were the same for each motor. To alleviate this problem when several motors of this type are used, all that needs to be done is that attention be paid to insure that all of the motors do not produce on the same phase the same polarity D.C. current thus the net D.C. component to the power transformed can be minimized.

Figure 7:
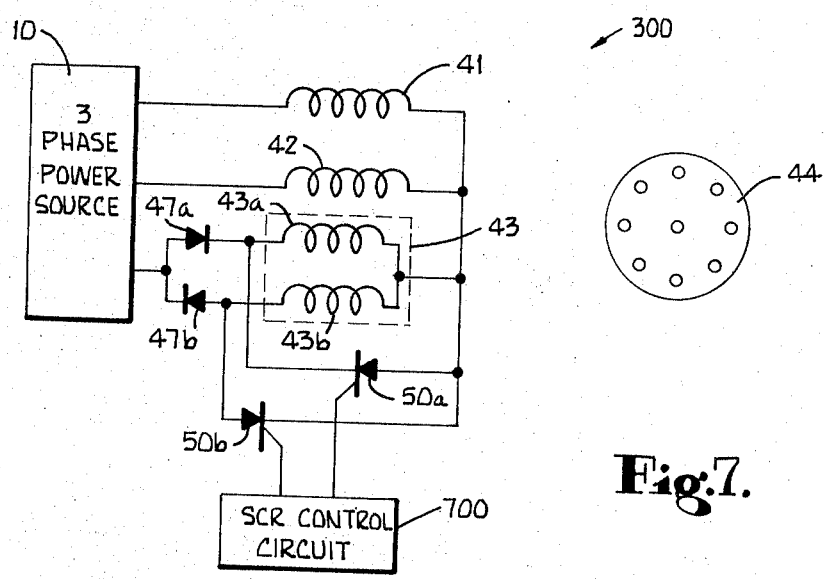
FIG. 7 illustrates another embodiment in which no D.C. component is introduced into the power line.

A better way to minimize the D.C. component introduced into the power line is to design the motor with windings 12 and 13 each being actually two windings which are separate from each other. One can then, by using another diode and SCR pair, introduce a net D.C. component of one polarity into one part of each of the windings and a net D.C. component of the opposite polarity into the other part of each of the windings. The net effect will be to eliminate the D.C. component from the power line and yet introduce D.C. fields into the motor with simple circuitry. Similarly the circuits of FIGS. 2 and 3 could be changed to eliminate the D.C. components in the power source; but since they are wye connected, only one winding (33 and 43) needs to actually have two partial windings. FIG. 7, which will be described later, illustrates this type of circuit.

In FIG. 1 it can be observed that the stator windings are connected in delta configuration and the rotor windings are connected in wye configuration. Other configurations for the stator and rotor are equally appropriate in FIG. 1.

Figure 2:
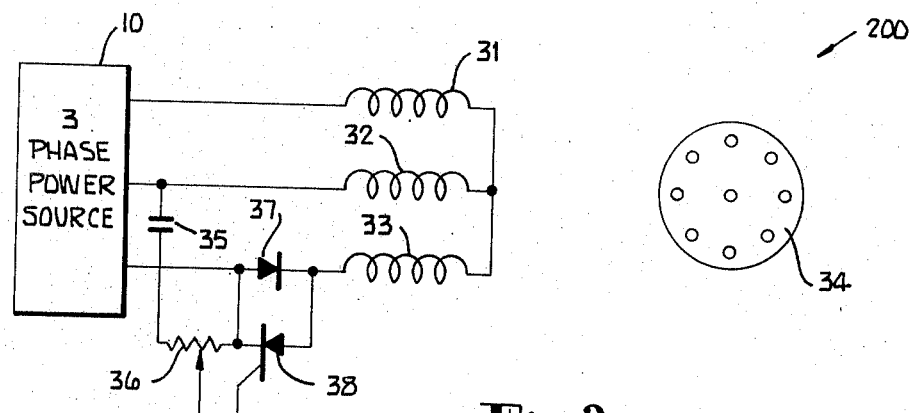
FIGS. 2 to 4 illustrate alternative embodiments of the invention in which a squirrel cage motor has a speed control derived simply from a setting of a potentiometer.

In FIG. 2 there is illustrated a three phase power source 10 as in FIG. 1 and stator windings 31, 32 and 33 of motor 200. A high resistance squirrel cage rotor 34 is the preferred rotor for use with the invention. The control circuit for this motor is a simple circuit which includes a diode 37 and SCR 38. The gate of SCR 38 is controlled by potentiometer 36 which receives a voltage from one of the phases through capacitor 35 which couples between the phase and the potentiometer. It is possible, on motors having more than one set of windings, for two control circuits to be used, one producing a net D.C. current in one direction and the other producing a net D.C. current in the other direction. Thus, the problem of introducing a D.C. component into the power lines can be essentially eliminated.

Figure 3:
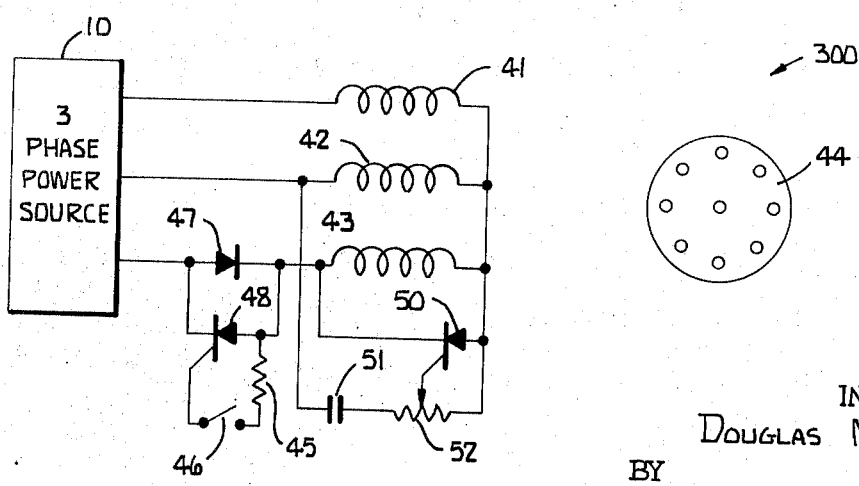

Referring to FIG. 3, there is illustrated a three phase power source 10 which connects directly to stator windings 41 and 42 and couples to stator winding 43 through a diode 47 and SCR 48 combination. SCR 48 is used simply as a switch which is closed during starting to allow maximum torque to be produced by the motor 300 when it is being started. Switch 46 and resistor 45 control the gate to SCR 48. The speed of the motor, which has a squirrel cage rotor 44, is determined by the setting of potentiometer 52 which derives a voltage through capacitor 51 and applies it to the gate of SCR 50. During normal operation of the motor, SCR 48 is gated off, a D.C. component is produced in winding 43 due to the action of diode 47. When SCR 50 is gated on, winding 43 is shorted during a portion of each cycle. This causes an increase in the dynamic braking of the motor beyond that which is caused by the diode 47 in series with winding 43.

It has been found that it is very important to have the resistance in the circuit of SCR 50 as low as possible for acceptable performance of the speed control circuit. As little as one ohm of resistance has been found to appreciably adversely affect the operation of the speed control circuit when used with a 3 horsepower motor. By adjusting potentiometer 52, various amounts of dynamic braking can be produced, thus causing various speeds of the motor to be produced. It can be noted that this motor has the same inherent stability as do the motor of FIG. 1 and 2 because of the fact that the speed control is accomplished through dynamic braking.

FIG. 7 illustrates a circuit similar to FIG. 3, but modified to eliminate the introduction of a D.C. component into the three phase power source. Winding 43 consists of two partial windings 43a and 43b which are separate. Diode 47a causes a net D.C. component to flow in partial winding 43a, while SCR 50a is used as diode 50 is used in the circuit of FIG. 3. Similarly diode 47b, partial winding 43b and SCR 50b cause a net D.C. component to flow, but in the opposite direction. An SCR control circuit 700 controls SCR's 50a and 50b to control the speed of the motor. The control circuit 700 is such that the net D.C. component created in each of the partial windings is essentially equal, thus the three phase power source will not receive any D.C. component from the motor.

Figure 4:
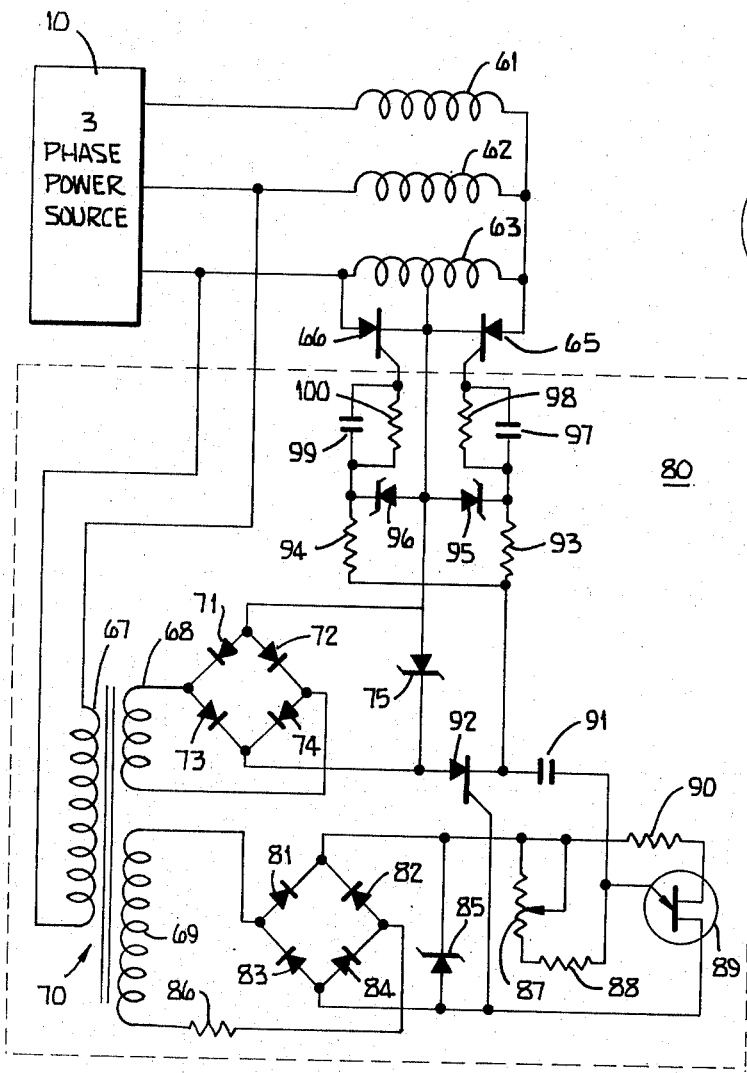

Referring now to FIG. 4 there is illustrated a motor 400 having stator windings 61, 62 and 63 and a squirrel cage rotor 64. This motor is connected to a three phase power source 10 which may include a switch device to simultaneously energize or de-energize the three outputs of the power source. The circuit of FIG. 4 uses two SCR's to introduce a D.C. current to the windings of the motor without introducing a D.C. component to any of the lines of the three phase power source. These two SCR's 65 and 66 are controlled by a control circuit 80. This control circuit 80 derives a voltage for its power supply from the three phase power source. This is supplied to the primary 67 of the transformer 70 having secondarys 68 and 69. Secondary 69 couples through a resistor 86 to a full wave bridge rectifier having diodes 81–84 which has an output voltage regulated by zener diode 85. This output voltage is used to operate the unijunction transistor oscillator having a transistor 89 which oscillates at a frequency determined by capacitor 91 and resistors a7, 88 and 90. The output of the oscillator can be varied by adjusting the variable resistor 87. The oscillator is coupled to the SCR's 65 and 66 through another portion of the control circuit which has power supply which includes the secondary 68 of transformer 70, diodes 71–74 and zener diode 75. SCR 92, resistors 93 and 94, zener diodes 95 and 96, capacitor 97 and 99 and resistors 98 and 100 are used in a conventional manner to control the gates of SCR 65 and 66.

Figure 5:
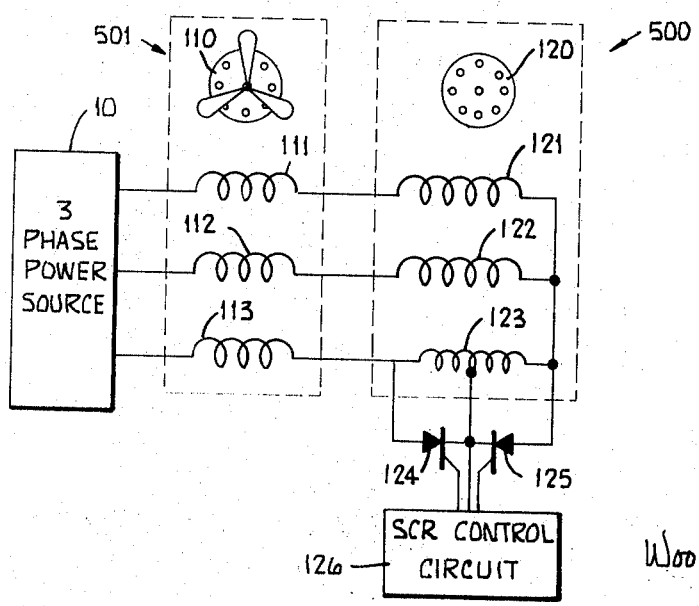
FIGS. 5 and 6 illustrate other alternative embodiments in which a squirrel cage motor also has a fan motor incorporated with it for cooling purposes.

In FIG. 5 there is illustrated a three phase power source 10 which connects not only to a motor 500 having stator windings 121, 122 and 123 but also to a fan motor 501 having stator windings 111, 112 and 113. Both motors are of the squirrel cage type, the fan motor 501 having a rotor 110 and the other motor 500 having a rotor 120. SCR's 124 and 125 are connected to winding 123 and are controlled by SCR control circuit 126 in a manner similar to the circuit of FIG. 4.

It may be noted that the circuit of FIG. 5 in operation will have an increased fan speed when the motor 500 speed decreases whether the decrease is due to an increased load on the motor or an adjustment in the SCR control circuit which increases the amount of D.C. braking introduced into winding 123. Thus the speed of the fan will to some degree be a function of the amount of heat produced in the stator winding.

Figure 6:
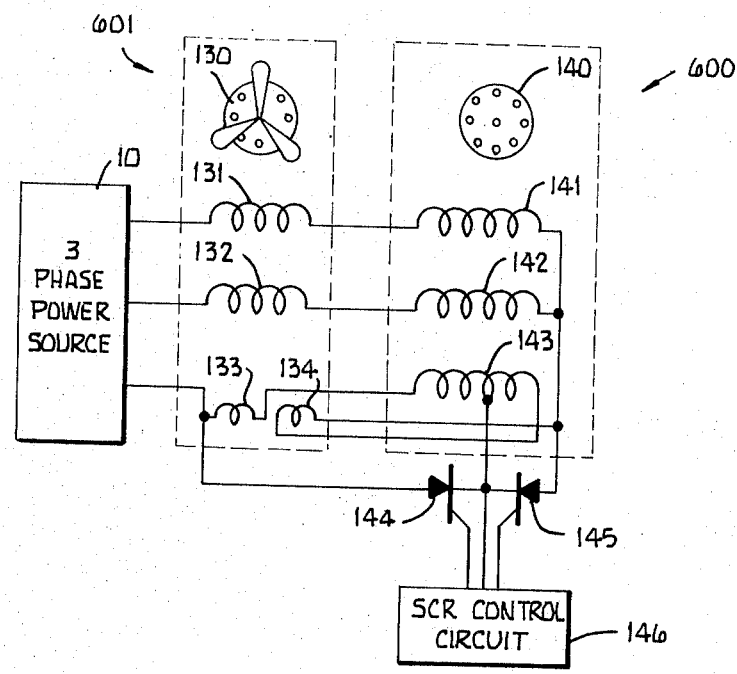

In FIG. 6 a somewhat similar arrangement is indicated in which the fan motor 601 having a rotor 130 and stator windings 131, 132, 133 and 134 and a main motor 600 having a squirrel cage rotor 140 and windings 142 and 143 are series connected. The control of the main rotor 600 is accomplished through SCR's 144 and 145 and SCR control circuit 146 in the manner similar to the control circuits of FIGS. 4 and 5. The SCR's are connected to stator windings 143 through the stator windings 133 and 134 of the fan motor 601. Thus when the SCR control unit is adjusted for maximum speed in the main motor 600, SCR's 144 and 145 will be gated off and neither the fan motor stator windings 133 and 134 nor the main stator winding 143 will have any direct current component passing through them. When the SCR control unit is adjusted for a minimum speed of the main motor, the SCR's 144 and 145 will be gated on at all times. It is preferred that the two sides of the center-tapped windings 63, 143, and 123 be as far from each other as is practical for optimum performance of the control circuit. Motors having alternately connected windings have been found to work quite well in the circuit of FIG. 6 as well as in other circuits using partial windings.

Figure 8:
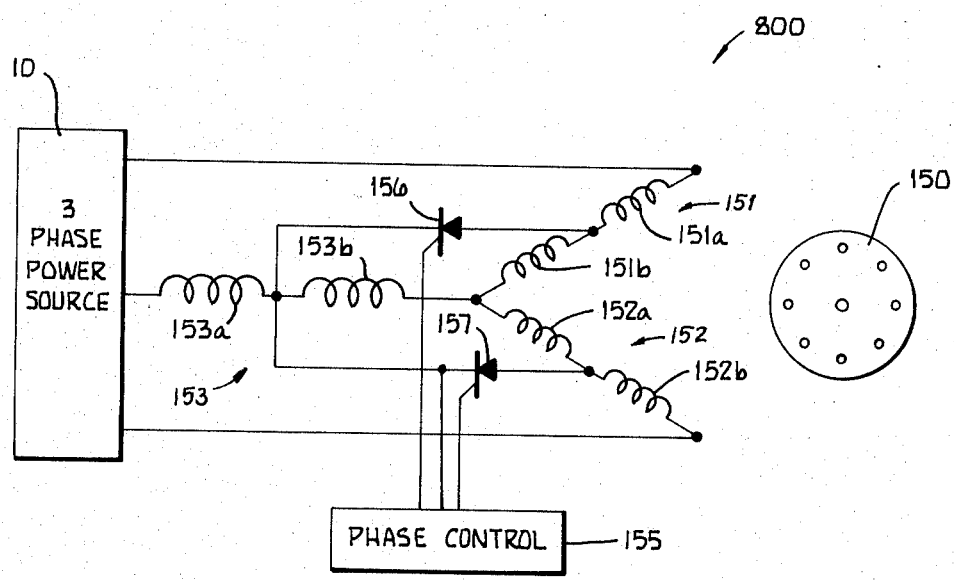
FIG. 8 illustrates an embodiment which can be easily used with many motors. No additional connections are made to the common connection of the three windings (which is not easily available for connection on many motors.)

FIG. 8 illustrates a motor 800 which has a control which is easy to add to existing motors and which has a minimum of parts. The motor has a squirrel cage rotor 150 and stator windings 151, 152 and 153 each formed from two partial windings, 151a and 151b, 152a and 152b, and 153a and 153b. Speed control is accomplished by placing SCR's 156 and 157 from the point of connection of the partial windings in each of two of the windings 151 and 152 to the point of connection in the third winding 153. The phase control 155 is of a conventional type of design.

While there has been described above the principles of this invention in connection with specific apparatus it is to be understood that this description is made only by way of example and not as a limitation to the scope of the invention.

What is claimed is:

1. In combination in a control arrangement for continuously varying the speed of a motor:
   a. an A.C. induction motor having at least a first and a second winding,
   b. a source of A.C. power having at least a first and second phase of voltage,
   c. said source of A.C. power having its first phase connected directly to said first winding,
   d. means for inserting a controlled D.C. component into the second winding of the motor to cause dynamic braking, which means includes:
      1. a rectifier connecting said second phase to said second winding,
      2. a controlled rectifying means connected across said rectifier,
      3. controlling means connected to said controlled rectifying means for continuously varying the rectification of said controlled rectifying means.

2. A combination as in claim 1 wherein siad motor is a three-phase squirrel-cage motor having three windings and said source of power is a three phase source, with two of said phases connecting directly to two of said windings.

3. A combination as in claim 2 wherein said controlling means includes a tachometer generator coupled to said motor.

4. A combination as in claim 1 wherein said controlled rectifying means is a silicon controlled rectifier.

5. A combination as in claim 4 wherein the gate of said silicon controlled rectifier is connected to a potentiometer which is coupled across two of the phases of said source of A.C. power.

6. In combination in a control arrangement for continuously varying the speed of a motor:
   a. an A.C. induction motor having at least a first and second winding,
   b. a source of A.C. power having at leeast a first and second phase of voltage,
   c. said first phase being connected directly to said first winding,
   d. a rectifier connecting said second phase to said second winding,
   e. a controlled rectifying means connected across said second winding,
   f. controlling means connected to said controlled rectifying means for continuously varying the rectification of said controlled rectifying means.

7. A combination as in claim 6 wherein said motor is a three-phase squirrel-cage motor having three windings and said source of power is a three phase source, with two of said phases connecting directly to two of said windings.

8. A combination as in cliam 6 wherein said controlled rectifying means is a silicon controlled rectifier.

9. In combination in a control arrangement for continuously varying the speed of a motor:
   a. an A.C. induction motor having at least a first and a second winding and a squirrel cage rotor,
   b. a source of A.C. power having at least a first and a second phase of voltage,
   c. said source of A.C. power being coupled to said windings,
   d. said second winding having connections at a centertap as well as at the first and second end of said winding,
   e. a first controlled rectifying means connected from said center-tap to said first end of said second winding and a second controlled rectifying means connected from said centertap to said second end of said second winding,
   f. controlling means connected to said first and second controlled rectifying means for continuously varying the rectification of said rectifying means.

10. A combination as in claim 9 wherein said motor has three windings and said source of power is a three phase source.

11. A combination as in claim 9 wherein said controlled rectifying means is a silicon controlled rectifier.

12. A combination as in claim 9 wherein said windings connect directly to said A.C. power source.

13. A combination as in claim 9 wherein one of said windings couples to one of said phases through a fan motor winding in a fan motor used to cool the windings of said A.C. induction motor.

14. A combination as in claim 13 wherein said A.C. induction motor has three windings and said source of power is a three phase source.

15. A combination as in claim 14 wherein said fan motor has three windings and each of which is in series with one of the connections from said source of power to said A.C. induction motor.

16. In combination in a control arrangement for continuously varying the speed of a motor:
   a. an A.C. induction motor having at least a first and a second winding,
   b. a source of A.C. power having at least a first and a second phase, c. said source of A.C. power bein connected to said first winding and coupled to said second winding,
d. said second winding being made of two partial windings which are separate in said motor,
e. the first end of each of said partial windings being connected to each other,
f. the second end of each of said partial windings being connected to a controlled rectifying means, there being one controlled rectifying means for each of the two partial windings, and
g. means for continuously varying the rectification of said controlled rectifying means whereby a D.C. component can be controlled in each of the partial windings without introducing a D.C. component into said source of A.C. power.

17. A combination as in claim 1 in which said A.C. induction motor has 3 windings, two of which connect directly to said power source; and said controlled rectifying means is an SCR.

18. In combination in a control arrangement for continuously varying the speed of a motor:
a. an A.C. induction motor having three windings each of which has two partial windings which are separate and are wired in series,
b. a source of A.C. power having three phases, each of said phases connecting to one of said windings,
c. two controlled rectifiers connecting from the point of connection of the partial windings in one of the windings to the point of connection of the partial windings in each of the other two windings,
d. means for continuously varying the rectification of said controlled rectifiers.

* * * * *